United States Patent

Landstorfer

[11] Patent Number: 5,252,057
[45] Date of Patent: Oct. 12, 1993

[54] APPARATUS FOR EJECTING MOLDINGS FROM AN INJECTION MOLDING MACHINE

[75] Inventor: Hans Landstorfer, Nürnberg, Fed. Rep. of Germany

[73] Assignee: Mannesmann Aktiengesellschaft, Dusseldorf, Fed. Rep. of Germany

[21] Appl. No.: 829,761

[22] Filed: Jan. 31, 1992

[30] Foreign Application Priority Data

Feb. 1, 1991 [DE] Fed. Rep. of Germany ....... 4103446

[51] Int. Cl.$^5$ ........................................... B29C 45/40
[52] U.S. Cl. ..................................... 425/556; 425/444
[58] Field of Search .................. 425/554, 556, 436 R, 425/444

[56] References Cited

U.S. PATENT DOCUMENTS

| | | | |
|---|---|---|---|
| 3,591,898 | 7/1971 | Stenmo | 425/556 |
| 3,844,703 | 10/1974 | Hutter | 425/556 |
| 4,731,014 | 3/1988 | Von Holdt | 425/556 |
| 4,832,307 | 5/1989 | Watanabe et al. | 425/556 |

FOREIGN PATENT DOCUMENTS

| | | | |
|---|---|---|---|
| 3542878 | 8/1989 | Fed. Rep. of Germany . | |
| 2414998 | 9/1979 | France | 425/554 |
| 0233113 | 1/1987 | France . | |
| 1546269 | 2/1990 | U.S.S.R. | 425/556 |

Primary Examiner—Scott Bushey
Attorney, Agent, or Firm—Cohen, Pontani, Lieberman, Pavane

[57] ABSTRACT

An apparatus for ejecting a molding from an injection molding machine includes a linearly moveable ejector plate. The ejector plate has a reciprocatingly movable coupling device for connecting the ejector plate to a mold ejector plate in a form-locked and force-locked manner. The ejector plate also has a hydraulic cylinder having a movable coupling piston connected to a coupling rod. This coupling rod has a head end which is insertable into the coupling sleeve of the mold ejector plate. The coupling rod is tubular within which an axially displaceable actuating rod is provided, while the actuating rod has a conically tapered front end. By displacement of the actuating rod relative to the coupling rod, the radially engaging head region of the coupling rod is widened by radially outwardly directed forces. Thus, in a coupled condition, the head ends of the coupling rod and the actuating rod are connected in form-locked and force-locked manner with the coupling sleeve so that all coupling play is prevented. Additionally, the tubular coupling rod is radially divisible and is provided with an annular chamber in the radially divisible region. An annular piston which is axially movable in the annular chamber is also provided on the actuating rod.

5 Claims, 3 Drawing Sheets

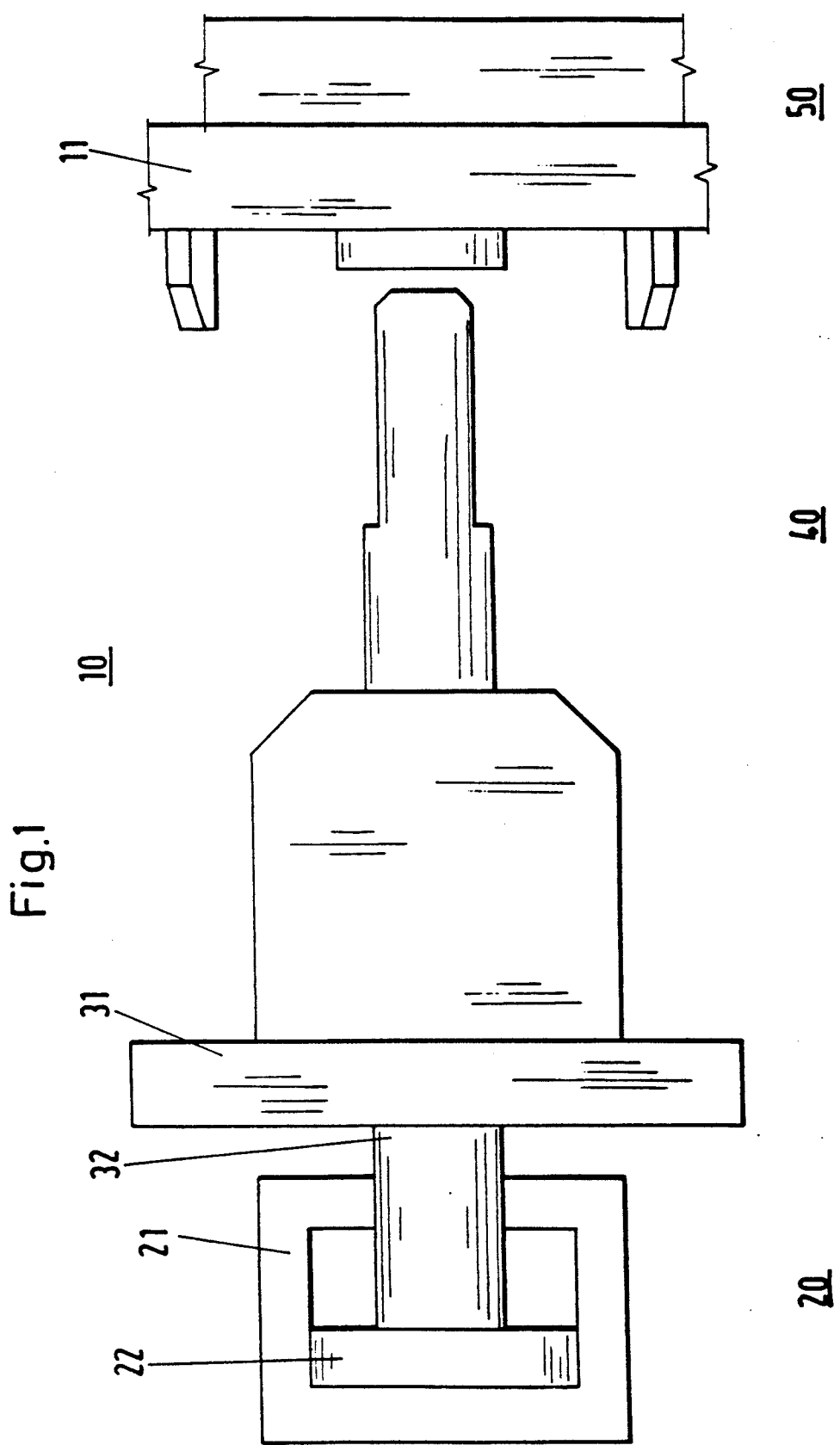

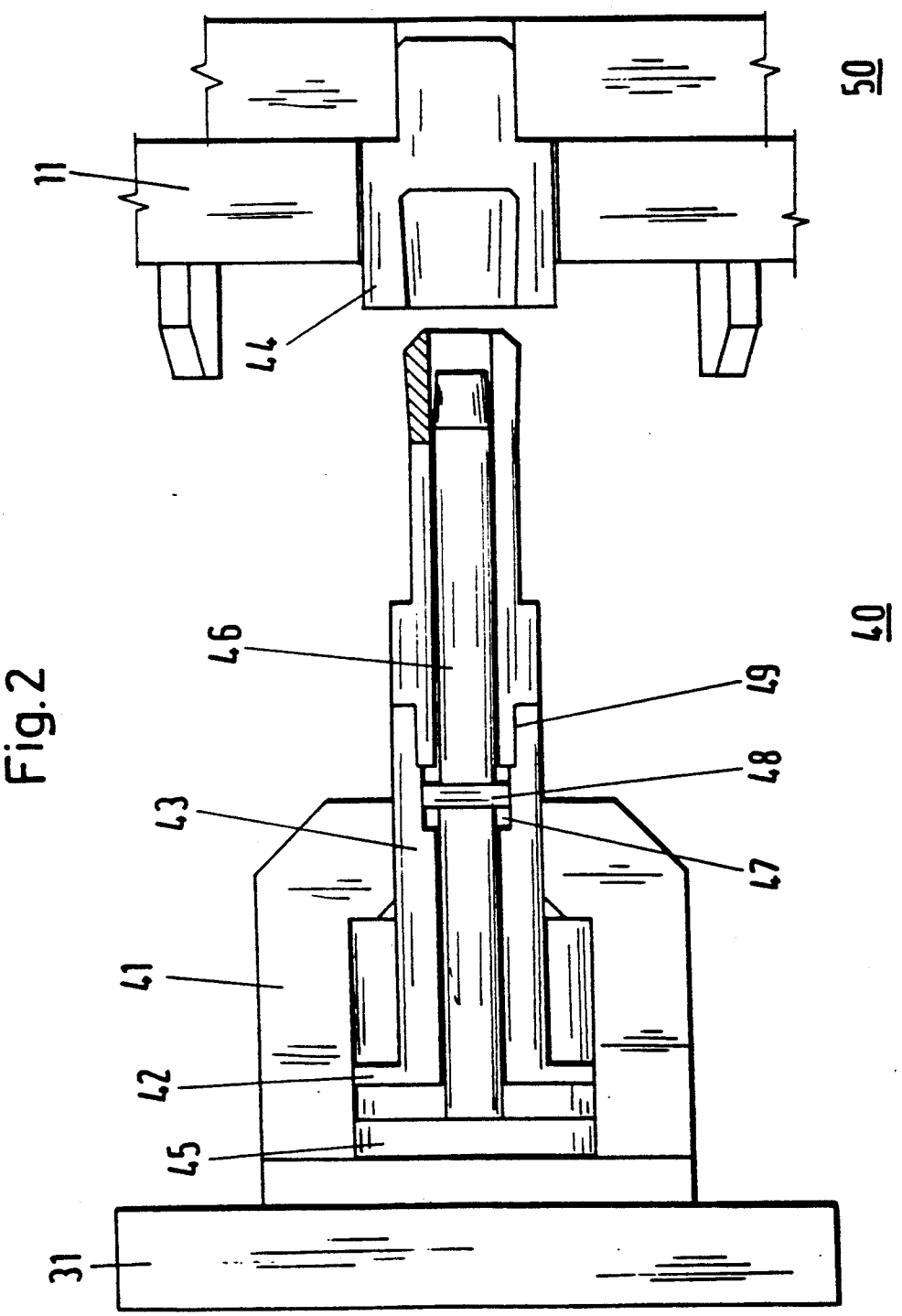

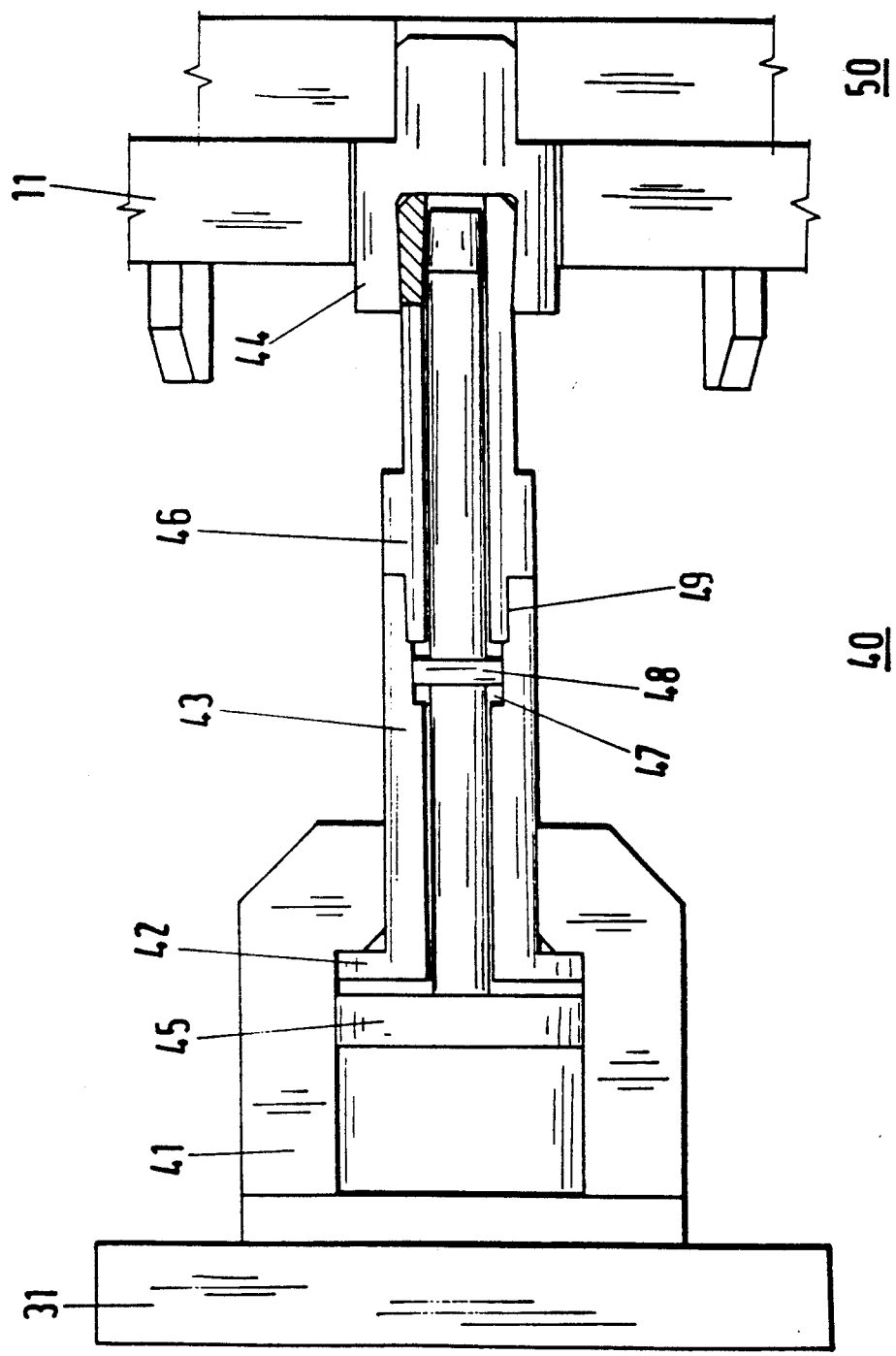

APPARATUS FOR EJECTING MOLDINGS FROM AN INJECTION MOLDING MACHINE

FIELD OF THE INVENTION

The present invention relates to an apparatus for ejecting moldings from an injection molding machine and particularly, to an apparatus having a laterally moveable ejection bar to which an ejector can be coupled in a form-locked and force-locked manner.

BACKGROUND AND SUMMARY OF THE INVENTION

Devices for ejecting moldings from injection molding machines are known. For example, Federal Republic of Germany Application No. OS 35 42 878 discloses an ejection device for injection molding machines in which hydraulically actuatable ejector pins are arranged on an ejector plate. However, the ejector pins are fastened in this connection to the ejector device by screw attachments on the piston of a hydraulic drive. Accordingly, this detachable screw connection does not suggest the use of an easily separable connection without manual intervention. Moreover, to unscrew this connection the complete dismounting stroke is required.

European Patent OS 02 33 113 discloses a coupling for an ejection device in which a piston-shaped rod can be inserted into a sleeve and held in a purely form-locked manner by radially displaceable pins. With this device, the entire distance corresponding to the overlapping male and female parts is required for the decoupling action. Additionally, the purely form-locked connection of the coupling has the disadvantage that a certain amount of play is present between the structural parts to be connected and that the coupling bar may possibly turn relative to the piston rod.

None of the prior art, however, teaches or suggests an apparatus for ejecting a molding from an injection molding machine with an ejection device having a compact coupling which permits a play-free transmission of force, which is easily separated and which does not require a travel path beyond the ejector stroke on the machine side.

It is, therefore, an object of this invention to provide an apparatus for ejecting moldings from an injection molding machine having an easily separable connection.

Another object of the invention is to provide an ejection machine which permits play free transmission of force.

A further object of the invention is to provide a connection that, for the decoupling thereof, does not require a travel path or distance beyond the ejector stroke on the machine side.

Still other objects and advantages of the invention will be apparent from the specification.

The ejector of the present invention includes a coupling sleeve having an inner surface which converges toward the head end of the coupling rod. The coupling sleeve is, in this connection, preferably fastened to the mold base plate and is arranged in an axial direction so that it extends only slightly and thus, without hinderance into the free space between the mold base plate and the ejector device.

The head of the coupling rod is insertable into the coupling sleeve. The coupling rod has, at its head end, a telescopically extendible rod, the end of which is dimensioned so as to fit closely into the coupling sleeve. The drive for the lateral movement of the coupling rod is preferably hydraulically actuated by utilizing the hydraulic system which is ordinarily present.

In a coupled condition, radially outwardly forces are applied to the front part of the coupling rod. These forces, beyond providing a mating fit between the coupling rod and the sleeve, permit clamping forces to act therebetween. These forces are substantial, since a relatively large piston surface is available. In this fashion, a form-locked (mechanical interference fit) and a force-locked (frictional fit) connection are obtained in a structurally simple manner by an actuating rod which is introduced centrally into the sleeve-shaped coupling member.

The tip or head region of the actuating rod is conically pointed and corresponds to the head region of the sleeve-shaped coupling rod which, preferably, also has a conical shape due to having a wall thickness which increases radially inwardly. Preferably, slits extending in the axial direction are provided in the head of the coupling rod to facilitate the increase of the diameter of the coupling rod head. After the head of the coupling rod is inserted into the coupling sleeve on the ejector plate, radially outwardly directed forces are applied by the movement of the actuating rod head region relative to the coupling rod head region in order to form the above-mentioned form-locked and force-locked connection.

In the coupled condition, the head ends of the coupling rod and actuating rod are connected in form-locked and force-locked manner with the coupling sleeve so that all coupling play is prevented. Therefore, with simple construction, high reliability in operation is obtained. Furthermore, this construction allows for the high reproducibility or repeatability of the coupling process.

In contrast to comparable ejectors of prior art injection molding machines in which the main piston is used for the coupling operation, the adjustable or reciprocatingly moveable coupling of the present invention prevents the loss of travel path or distance of travel in the region of the end-position of the opening phase of the ejector device. In this connection, the rear region, namely the space between the bottom of the main cylinder and the base surface of the main piston is particularly important and necessary for the end position damping of the ejector.

An actuating rod can furthermore also be arranged alongside of the actuating piston with the actuating rod in the coupled position, permitting a simple loosening of the coupling piston from the actuating piston.

Additionally, the tubular coupling rod is preferably radially divisible and provided with an annular chamber. An annular piston which is axially movable in the annular chamber is provided on the actuating rod.

BRIEF DESCRIPTION OF THE DRAWINGS

The present invention is explained in further detail with reference to the drawings, in which:

FIG. 1 is a partly cross-sectional diagrammatic view of the ejector device of the present invention;

FIG. 2 is a longitudinal cross-sectional view showing the ejector rod and coupling in an uncoupled position; and FIG. 3 is a cross-sectional longitudinal view showing the ejector rod and coupling in a coupled position.

For convenience of reference, like components, structural elements and features in the various figures are designated by like reference numerals.

DETAILED DESCRIPTION OF THE PRESENTLY PREFERRED EMBODIMENTS

FIG. 1 shows a part of a mold base plate of an injection molding machine 10 (not otherwise shown). In the direction of central axis 1, a cylinder 21 of the ejector device 20 is shown diagrammatically. Within the main cylinder 21 there is a main piston 22 to which a piston rod 32 is fastened. At the head end of the piston rod 32 an ejector plate 31 is arranged which, in turn, is connected to a coupling device 40 including coupling cylinder 41 and coupling sleeve 44.

FIGS. 2 and 3 show, in detail, the construction of the coupling device 40. FIG. 2 shows an uncoupled state of the coupling device 40, while FIG. 3 shows a coupled state in which coupling device 40 is connected to a mold ejector plate 50, shown only diagrammatically.

The coupling device 40, which is developed as a sleeve coupling includes a coupling sleeve 44 which is guided by a mold base plate 11 of the injection molding machine in the direction of the axis 1 of the coupling sleeve 44. The end of the coupling sleeve 44 facing away from the ejector plate 31 is held in the mold ejector plate 50.

During the coupling operation, the head of the coupling rod 53 is introduced into coupling sleeve 44 as shown in FIG. 3. The coupling rod 43 is provided on the end facing away from the coupling sleeve 44 with a coupling piston 42 which is arranged in a coupling cylinder 41. The coupling cylinder 41 is fastened on ejector plate 31.

The coupling rod 43 is configured as a tube. An actuating rod 46 is linearly moveable within the tubular coupling rod 43. The actuating rod 46 is tapered conically at its head end 54 and at its opposite front end has an actuating piston 45 which, in addition to the coupling piston 42, is disposed in the coupling cylinder 41.

By relative displacement of coupling rod 43 and actuating piston 45 towards each other, the head region 53 of the sleeve-shaped coupling rod 43 is widened after insertion into the coupling sleeve 44 so that in this way a force-locked and form-locked connection is obtained.

Preferably, the coupling rod 43 has a joint 49 at which the coupling rod is axially separable. On the actuating rod 46, there is preferably provided an annular piston 48 which is movable within a chamber 47 formed in the sleeve-shaped coupling rod 43. This small annular piston 48 supports the displacement of the actuating rod 46 relative to the coupling rod 43, particularly when the two pistons 45 and 42 lie very close to each other.

It should be understood that the preferred embodiments described are for illustrative purposes only and are not to be construed as limiting the scope of the present invention which is properly delineated only in the appended claims.

What is claimed is:

1. An apparatus for ejecting a molding from an injection molding machine comprising:
a linearly movable ejector plate (31) and a reciprocating movable coupling device (40) for connecting said ejector plate (31) to a mold ejector plate (50), the coupling device (40) comprising a hydraulic cylinder (41) attached to said ejector plate (31), a coupling piston (42) movably disposed within said hydraulic cylinder (41), a coupling rod (43) attached to said coupling piston (42) in said hydraulic cylinder (41), a coupling sleeve (44) engaged with the mold ejector plate; said coupling rod (43) having a head end (53) for insertion into said coupling sleeve (44) and means for locking said head end (53) to said coupling sleeve (44) by radially widening said head end.

2. An apparatus for electing a molding from an injection molding machine, comprising a linearly movable ejector plate (31) and a reciprocatingly movable coupling device (40) for connecting said ejector plate (31) to a mold ejector plate (50), the coupling device (40) comprising a hydraulic cylinder (41) attached to said ejector plate (31), a coupling piston (42) movably disposed within said hydraulic cylinder (41), a coupling rod (43) attached to said coupling piston (42) in said hydraulic cylinder (41), a coupling sleeve (44) engaged with the mold ejector plate (50), said coupling rod (43) having a head end (53) for insertion into said coupling sleeve (44), said coupling rod (43) being configured as a tube extending along an axis, said coupling device (40) further comprising an actuating piston (45) within said hydraulic cylinder (41) and an actuating rod (46) connected to said actuating piston (45) and reciprocatingly displaceable within said tubular coupling rod (43), said head end (53) of said tubular coupling rod (43) having a wall thickness, wherein said wall thickness of said head end (53) increases radially inwardly with respect to said axis, said actuating rod (46) comprising a conically tapered head end (54), said coupling sleeve (44) comprising an inner surface converging toward said head end (53) of said coupling rod (43), wherein said head end (53) of said coupling rod (43) is inserted into said coupling sleeve (44) and when said actuating rod (46) is displaced relative to said coupling rod (43) in a direction toward said coupling sleeve (44), said head end (53) of said coupling rod (43) is widened by radially outwardly directed forces so that relative movement between said coupling sleeve (44) and said ejector plate (31) is prevented.

3. The apparatus of claim 2, wherein said coupling rod (43) head end has at least one axial slot.

4. The apparatus of claim 2, wherein said tubular coupling rod (43) further comprises a radially divisible joint and an annular chamber at said joint.

5. The apparatus of claim 4, further comprising an annular piston (48) mounted on said actuating rod (46) and axially movable in said annular chamber.

* * * * *